(12) United States Patent
Guo et al.

(10) Patent No.: US 7,574,437 B1
(45) Date of Patent: Aug. 11, 2009

(54) METHOD FOR IDENTIFYING NEW OR RECENTLY CHANGED TELEPHONE SERVICE

(75) Inventors: Xiaodan Guo, Lake Hopatcong, NJ (US); Robert C. Hain, Berkeley Heights, NJ (US); Ronald Mueller, Neshanic Station, NJ (US); William J. Infosino, Watchung, NJ (US); John G. Ramage, Westfield, NJ (US)

(73) Assignee: AT&T Corp., New York, NY (US)

( * ) Notice: Subject to any disclaimer, the term of this patent is extended or adjusted under 35 U.S.C. 154(b) by 330 days.

(21) Appl. No.: 11/240,293

(22) Filed: Sep. 30, 2005

(51) Int. Cl.
*G06F 1/00* (2006.01)
*G06F 17/30* (2006.01)

(52) U.S. Cl. ............... 707/7; 707/3; 707/6; 707/10
(58) Field of Classification Search ............. 707/3, 707/7, 10; 379/218.01, 221.12, 201.13
See application file for complete search history.

(56) References Cited

U.S. PATENT DOCUMENTS

| | | | |
|---|---|---|---|
| 5,465,290 A | 11/1995 | Hampton et al. | |
| 5,467,385 A | 11/1995 | Reuben et al. | |
| 6,453,037 B1 | 9/2002 | Welter, Jr. | |
| 6,526,126 B1 | 2/2003 | Morganstein et al. | |
| 6,711,254 B2 * | 3/2004 | Sato et al. | 379/265.02 |
| 6,760,413 B2 | 7/2004 | Cannon et al. | |
| 6,763,091 B2 | 7/2004 | Shimada | |
| 6,823,049 B2 | 11/2004 | Tsai et al. | |
| 6,868,268 B2 | 3/2005 | Worsham et al. | |
| 6,876,658 B2 | 4/2005 | Epley | |
| 6,917,674 B2 | 7/2005 | Gilbert | |
| 6,961,420 B2 * | 11/2005 | DeSalvo | 379/355.02 |
| 7,068,768 B2 * | 6/2006 | Barnes | 379/142.15 |
| 7,142,652 B2 * | 11/2006 | Ho | 379/133 |
| 2001/0040955 A1 * | 11/2001 | Zolner et al. | 379/218.01 |

* cited by examiner

*Primary Examiner*—Baoquoc N To
(74) *Attorney, Agent, or Firm*—Fay Kaplun & Marcin, LLP

(57) ABSTRACT

A method for identifying new customers or recently changed telephone services is disclosed. The methodology discovers systems and methods for capturing telephone numbers that appear on the records of recent telephone calls of a communications network, which can or cannot be a network customer, and categorizing the telephone number as a known telephone number or an unknown telephone number. The methodology includes looking-up a name and address for telephone numbers, which are categorized as unknown telephone numbers, in a current directory service. A comparison can be performed using the looked-up name and address from the current directory service with names and addresses in a historical data source. If the looked-up name and address from the current directory service differ from name and address in the historical data source, the unknown telephone number is identified as a new customer or a recently changed telephone service.

10 Claims, 1 Drawing Sheet

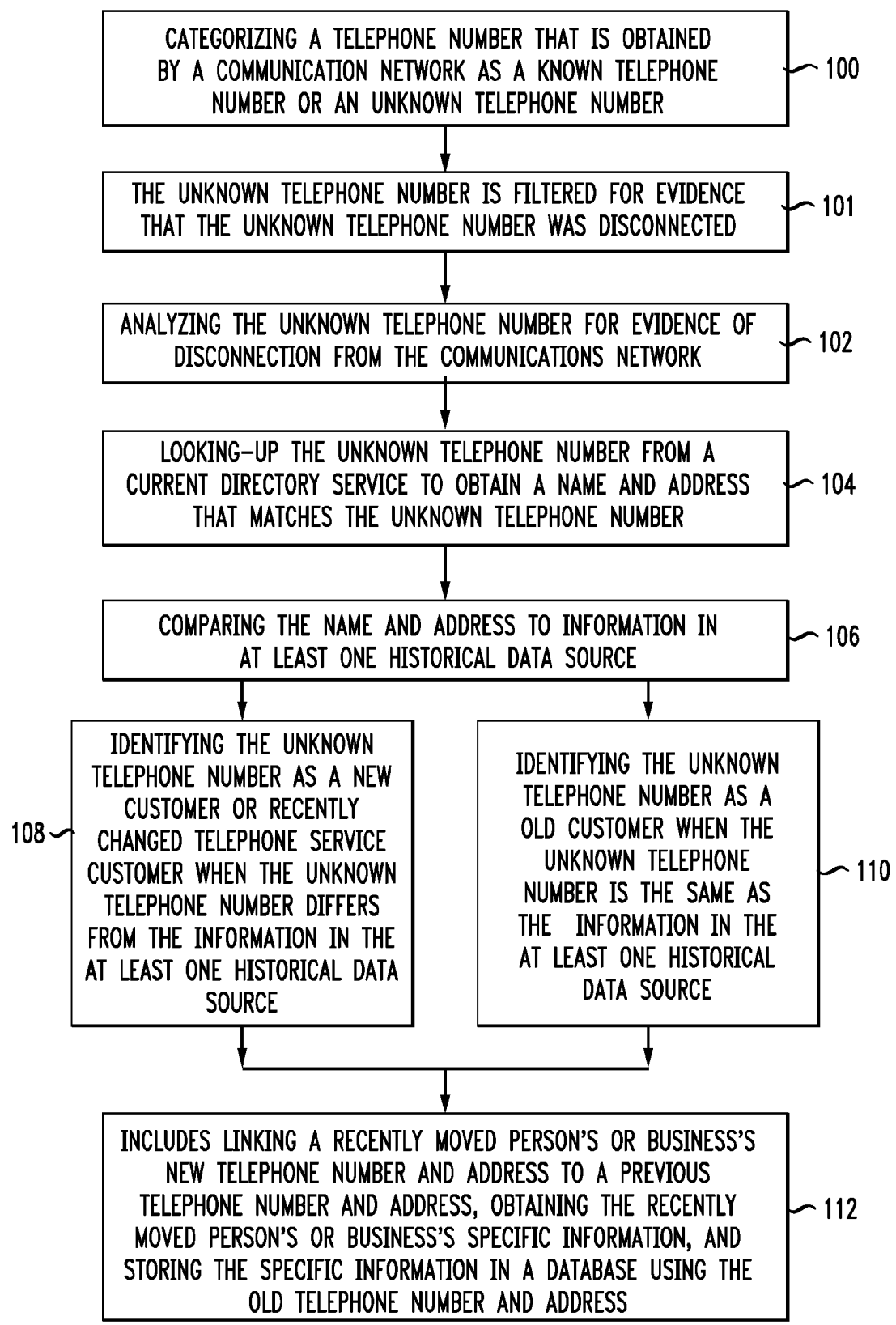

METHOD FOR IDENTIFYING NEW OR RECENTLY CHANGED TELEPHONE SERVICE

FIELD

The present embodiments relate generally to a method for identifying new or recently changed telephone services.

BACKGROUND

Statically, research has shown that approximately twenty percent of households move each year. Accordingly, this statistic creates a critical importance with regard to obtaining new demographic information, such as addresses and telephone numbers, for each relocated household.

Additionally, research has determined that new businesses are created in portions of the United States at an annual rate of about ten to over one-hundred per year, depending on the geographic locale.

Telephone companies and internet service providers desire to have real time information about new customer phone numbers and business phone numbers, even when these customers and businesses are not using their communication networks.

A need exits for a consolidated, simple, fast and efficient manner to ascertain whether an out-of-network customer is a "new business" or a "new customer" to a certain geographic area, or area code.

An up-to-date real time list of all businesses and customers is extremely valuable to telemarketers and security authorities of the United States, particularly at this time when national security is paramount.

Thus, one of the current problems relates to the need for a system and/or method for obtaining new household or new business names, addresses and telephone numbers for the purposes of maintaining Customer Relationship Marketing (CRM) databases and prospective lists.

Accordingly, another current problem relates to the need for a system and/or method for readily obtaining information about recently changed customer service for customers who are outside the network.

The present embodiments meet all these needs.

SUMMARY

The present embodiments are methods for quick, easy, and efficient identification of new businesses and customers, in and out of a network, for a specific group of records, such as a geographic region. New or recently changed telephone services for a defined area can be identified for businesses and other customers, even if the telephone numbers do not belong to customers or businesses of a particular network.

The embodiments provide a cross-network method for identifying all new business and new individual customers for a defined area. The methods can begin by capturing of a telephone number that appears on a telephone record as a recent telephone call by a customer of that network or when the customer does not belong to that network. The telephone number is categorized as a known telephone number or an unknown telephone number. Network communication company records can be reviewed to determine if there is evidence of disconnection to determine a name and address associated with the unknown phone numbers. The methods continue by looking up a name and address for the unknown telephone number from a current directory service, particularly with a service operating in real time with an up-to-the-minute directory. The name and address identified from the current directory service can be compared to a historical data source. If the name and address from the current directory service differs from the name and address in the historical data source, the captured telephone number can be identified as a new telephone number or recently changed telephone number or service.

BRIEF DESCRIPTION OF THE DRAWINGS

The detailed description will be better understood in conjunction with the accompanying drawings as follows:

FIG. 1 depicts a flow diagram of an embodiment of the invention.

The present embodiments are detailed below with reference to the listed FIGURES.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments relate to methods for determining all new customers or recently changed telephone services for a defined area. The defined area has different communication networks, such as local communication networks and long distance communication networks as well as cellular communication networks, satellite communication networks, fiber-optic communications networks, Internet communication networks, and other similar communications networks.

For a single geographic area, such as Bedminster, N.J., there can be several overlapping communications networks. For example, multiple cellular services can be in combinations with multiple Internet Service Provider (ISP) services that provide voice or IP communications in addition to the conventional land phone lines. Similarly, a group of areas, such as the phone area codes (e.g., 212, 215, and 202) might be of interest to a communications company in order to identify all their customers in a particular area code as well as all potential customers in that area code.

The present embodiment allows a first network communications company to determine customers from other communications networks as "new customers" or customers with "changed telephone service" in a fast, efficient, and quick system. This system can yield a set of telephone numbers for customers not currently with the first network communications company.

The methods involve the network communications company categorizing telephone numbers, which appear on the company's records of recent telephone calls as "known telephone numbers" or "unknown telephone numbers".

A known telephone number can be an existing customer of the first network communications company. For example, if the network communications company is AT&T, the known telephone numbers can include: the phone numbers of existing customers; the phone numbers of advertisers to the customers of the AT&T network in which the advertisers might not be telephone service customers; and the phone numbers of state agencies and governmental authorities that might not be customers of the AT&T network, but who are identifiable by available Internet records, and other records. Accordingly, the known telephone number can be a customer of the communications network or a known customer of another communications network.

The unknown telephone numbers are of particular interest and can be checked, as a first step, against network communications records for evidence of disconnection from the network. This can determine if a name and address for the unknown number exists in the communications network company records.

A next step can be looking up a name and address to match the unknown telephone number from a current directory service. This involves inputting the telephone number to see the actual name and address that matches the telephone number. After a name and address are looked-up and procured for the unknown telephone number, the looked-up name and address are compared to at least one historical data source. If the looked-up name and address from the current directory service differs from the name and address in the at least one historical data source, then the currently looked-up name and address identify the corresponding unknown telephone number as a new customer or recently changed telephone service customer.

The unknown telephone numbers can be identified by ascertaining the numbers through calling an existing customer of the communications network or through a customer of the communications network calling the number. The existing customer can provide the number to the communications network in other ways, for example as an emergency telephone number. The communications network can obtain the number through other avenues such as advertisers, purchased lists of numbers, or any other means.

The embodiments contemplate that the identified unknown telephone number can be classified into a variety of categories, including: "likely residence", "likely business", "likely wireless", or any combinations of these or others as applicable. The categories serve to speed the identification process and to reduce the number of records needed to be searched for a given group of numbers. This classification can be performed using one of a variety of tools which can include the characteristics of the calls made or received by the unknown telephone number.

The characteristics of a call can include the time a call is initiated or received and the duration of a call, for example ten-seconds or one-hour. Characteristics can include the source of a call, such as originating from a known store, a known telemarketer, a known customer, or any combinations thereof. Characteristics of a call can include an analysis of records for assigning telephone numbers, which can include an analysis of the way a local communication company assigns phone numbers. For example, a communications network can assign the number 713-111-1111 as the main call-in number to a law firm. Direct dial phone numbers can be assigned as a block of twenty-five phone numbers to be used as direct dial numbers for individual attorneys. Accordingly, the calls to the firm can progress in an orderly fashion, from 713-111-1111 to 713-111-1112, continuing to 713-111-1113 and so on, rather than permitting a non-law firm customer to have one of the sequential numbers. Combinations of these tools can be used as well.

The unknown telephone number can be filtered further for evidence that the unknown telephone number was previously disconnected. Filtering of the unknown telephone numbers can be performed by examining records of the communications network that show activity to and from the unknown telephone number. Filtering can be performed by reviewing one or more lists of disconnected telephone numbers, supplied from a vendor to the first communications network, which may contain the unknown telephone number. Filtering can be performed additionally by entering the unknown telephone number into a communications industry database titled Customer Account Record Exchange, which contains telephone numbers for the area on industry information, reviewing one or more lists of disconnected telephone numbers available from telemarketing companies for telephone numbers which can contain the unknown telephone number, or any combinations of these and related items.

As previously described, the looked-up names and addresses are compared to historical data sources to facilitate the identification of the names and numbers. Examples of historical data sources can include printed telephone books; vendor sources that have obtained information about telephone records, in which the age of the records can be from about one-month to up to and over fourteen-months old; communications network records over one-month old, and any combinations thereof.

The embodiments enable a communications network company, to maintain prospects and Customer Relationship Marketing (CRM) databases in an up-to-date, real time manner.

The methods enable identifications of residence and business names, addresses and telephone numbers in a prospect or CRM database that are no longer valid because of household and business moves or disconnections. The methods enable linking of a recently moved person or business's new telephone number and address to a previous telephone number and address in order to obtain household or business specific information sometimes called "customer segment information" that can be stored in the database under the old telephone number and address. This segment information can be particularly useful to obtain and maintain, such as information on ethnicity or communication intensiveness for future marketing purposes.

While this embodiment focuses on the identification of new household or small business names, addresses and telephone numbers, any telephone company's or other communication company's network information can be used with regard to this methodology. Furthermore, the embodiments can be for the identification of new household information as well as for the identification of information regarding new small businesses including "work at home" businesses.

The following is an example of how the embodied methods can be used to obtain a new household telephone number, name, and address:

Step 1—Capture "Recently Active Telephone Numbers". "Recently Active Telephone Numbers" can be defined to be the telephone numbers that appear on the call records of recent telephone calls carried on the AT&T communications network. The call records contain both the calling (i.e., incoming to a customer) and the called (i.e., out-going from a customer) telephone numbers. Since the called telephone numbers might not be an AT&T customer, these records and methods capture both AT&T and non-AT&T customers.

Step 2—Categorize "Each Recently Active Telephone Number". Each recently active telephone number can be categorized as a known number, such as a known residence, known business, known public number, known wireless number, known governmental number, or any other known number. The recently active telephone numbers can be categorized as an unknown telephone numbers, as well. The known telephone numbers can be identified by comparing the recently active numbers to the telephone numbers that appear on lists of known current and former AT&T customers, and on vendor-provided lists or advertising directories. The unknown telephone number are the recently active telephone numbers that do not appear on any such lists.

a. Step 3—Categorize each "unknown telephone number". Each unknown telephone number can be categorized as a "likely" residence number or a "likely" business number or a "likely" wireless number or a "likely satellite" number or some other "likely" category to help facilitate the search process. The calls made or received by the unknown telephone number can be classified according to data such as: time of the call, such as 2:05 pm; day of week of call such as Tuesday; date of the call, such as Sep. 21, 2005, duration of the call such as, less than 2 minute calls, source of the calls such as a telemarketing company, other characteristics of telephone numbers calling or called by the unknown telephone number; and combinations thereof.

Step 4—Review the selected group of "unknown telephone numbers". The unknown telephone numbers can be observed for evidence of previous disconnection. Such evidence can include the fact that the telephone number has not been observed on the communications network for a long period of time.

Step 5—Check an up-to-date third party electronic directory service. An up-to-date third party electronic directory service, such as Acxiom's EDA service, can be searched to see if a given observed unknowns' current name and/or address are available. If the information is available, a comparison of this current name and address can be made to the name and address that appears for the telephone number in a less up-to-date source. Such sources can include the names and addresses in AT&T's records of former AT&T customers or in vendor-provided lists. If the name and address in the up-to-date list differs from that of the older list, the name, address, and telephone number are identified as belonging to a new household.

Unique and innovative to this embodiment can be the use of records of telephone calls on the communications network to make deductions about non-communications network customers.

The embodiments of the invention can be better understood with reference to FIG. 1. FIG. 1 depicts a flow diagram of an embodiment of the method for identifying new or recently changed telephone service. The first step in the depicted embodiment of the invention is step 100, which is categorizing a telephone number that is obtained by a communication network as a known telephone number or an unknown telephone number. In step 101, the unknown telephone number is filtered for evidence that the unknown telephone number was disconnected.

The next step 102 includes analyzing the unknown telephone number for evidence of disconnection from the communications network. Step 104 is looking-up the unknown telephone number from a current directory service to obtain a name and address that matches the unknown telephone number. Then step 106 is performed, which includes comparing the name and address to information in at least one historical data source.

Step 108 includes identifying the unknown telephone number as a new customer or recently changed telephone service customer when the unknown telephone number differs from the information in the at least one historical data source. In the alternative, step 110 can be performed, which is identifying the unknown telephone number as an old customer when the unknown telephone number is the same as the information in the at least one historical data source. Step 112 includes linking a recently moved person's or business's new telephone number and address to a previous telephone number and address, obtaining the recently moved person's or business's specific information, and storing the specific information in a database using the old telephone number and address.

While these embodiments have been described with emphasis on the embodiments, it should be understood that within the scope of the appended claims, the embodiments might be practiced other than as specifically described herein.

What is claimed is:

1. A method for identifying new or recently changed telephone service comprising the steps of:
   categorizing a telephone number that is obtained by a communication network as a known telephone number or an unknown telephone number;
   analyzing the unknown telephone number for evidence of disconnection from the communications network by checking the unknown number against the communications network company records;
   c. looking-up the unknown telephone number from a current directory service to obtain a name and address that matches the unknown telephone number;
   d. comparing the name and address to information in at least one historical data source; and
   e. identifying the unknown telephone number as a new customer or recently changed telephone service customer when the unknown telephone number differs from the information in the at least one historical data source, or identifying the unknown telephone number as an old customer when the unknown telephone number is the same as the information in the at least one historical data source.

2. The method of claim 1, wherein the known telephone number is a customer of the communications network, or a known customer of another communications network.

3. The method of claim 1, wherein the unknown telephone number is a number calling a customer of the communications network or a number called to by a customer of the communications network.

4. The method of claim 1, further comprising the step of classifying the unknown telephone number as a likely residence number, a likely business number, a likely wireless number, a likely satellite number, or combinations thereof.

5. The method of claim 4, wherein the step of classifying is performed using a member of the group consisting of:
   a. characteristics of the calls made or received by the unknown telephone number comprising:
      i. time of call;
      ii. day of week of call;
      iii. date of call;
      iv. duration of call,
      v. source of calls,
      vi. characteristics of telephone numbers calling or called by the unknown telephone number; and
      vii. combinations thereof,
   b. an analysis of records for assigning telephone numbers; and
   c. combinations thereof.

6. The method of claim 1, further comprising the step of filtering the unknown telephone number for evidence that the unknown telephone number was disconnected.

7. The method of claim 6, wherein the step of filtering is performed using a member of the group consisting of:
   a. records of the communications network that show activity to and from the unknown telephone number;
   b. a list of disconnected telephone numbers supplied from a vendor to the communications network which may contain the unknown telephone number;
   c. a communications industry database titled "Customer Account Record Exchange" containing telephone numbers for the area;

d. at least one list of disconnected telephone numbers available from telemarketing companies for telephone numbers which would contain the unknown telephone number; and e. combinations thereof.

8. The method of claim 1, wherein the historical data source is a printed telephone book, a vendor source that obtains information from sources of information over one month old, network communications company records over one month old, or combinations thereof.

9. The method of claim 1, further comprising the step of linking a recently moved person's or business's new telephone number and address to a previous telephone number and address, and obtaining the recently moved person's or business's specific information, and storing the recently moved person's or business's specific information in a database using the old telephone number and address.

10. The method of claim 1 further comprising the step of identifying the unknown telephone number as a recently changed telephone service customer when the unknown telephone number differs from the information in the at least one historical data source.

* * * * *